Aug. 13, 1940.  L. W. RUSHBROOK  2,211,675
DISK ATTACHMENT FOR SPRING-TOOTHED HARROWS
Filed Sept. 14, 1939
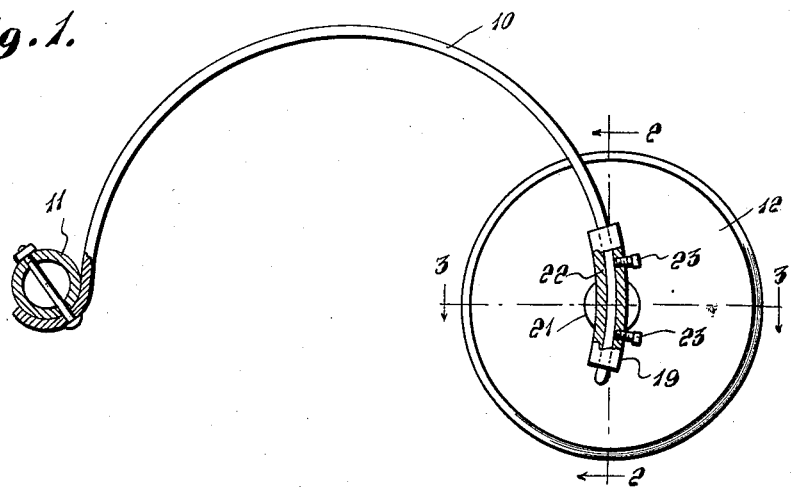
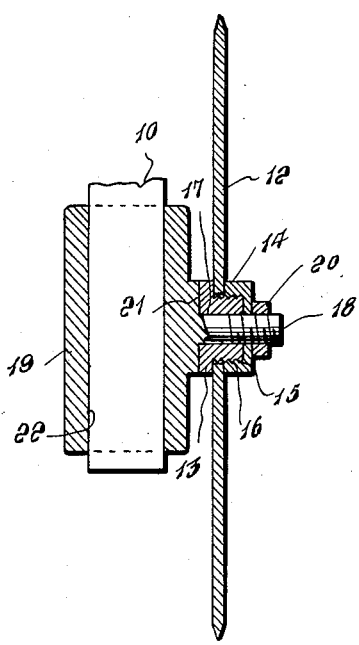
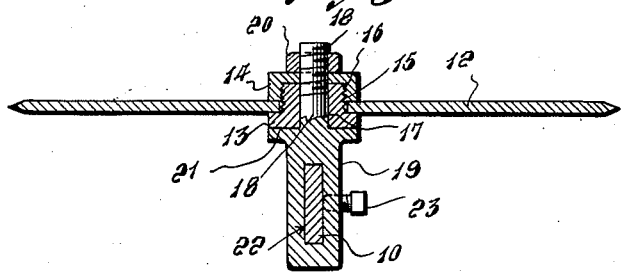
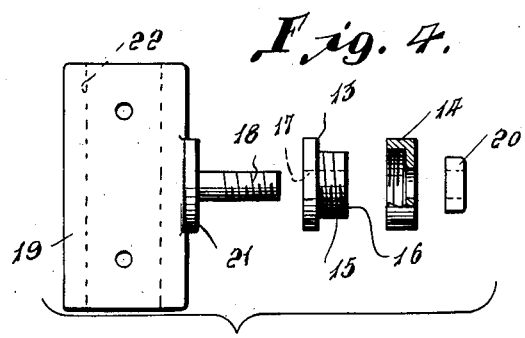
Inventor
Lloyd W. Rushbrook
Attorney Patented Aug. 13, 1940

2,211,675

UNITED STATES PATENT OFFICE 2,211,675

DISK ATTACHMENT FOR SPRING-TOOTHED HARROWS

Lloyd W. Rushbrook, Kendall, N. Y.

Application September 14, 1939, Serial No. 294,959

5 Claims. (Cl. 97—209)

This invention relates to an attachment for the teeth of harrows of the spring tooth type and is designed for use when the soil is unduly rough and hard, and it provides a disk for each tooth, which is rotatable to cut or treat the soil.

A particular object is to provide such an attachment or device with a novel means for rotatably mounting a disk and attaching the same along an arcuate engaging surface, with the harrow tooth.

The more specific objects and advantages will become apparent from a consideration of the description following taken in connection with accompanying drawing illustrating an operative embodiment.

In said drawing:

Figure 1 is a view fragmentarily showing a spring toothed harrow equipped with one of my attachments, the latter being partly in section and broken away to disclose details;

Figure 2 is a vertical sectional view taken on the line 2—2 of Figure 1;

Figure 3 is a horizontal sectional view taken on the line 3—3 of Figure 1, and

Figure 4 is a view of the mounting for the disk, the parts of the mounting being disassembled.

Referring specifically to the drawing wherein like reference characters designate like or similar parts, 10 designates a conventional arched or arcuate tooth of a spring-toothed harrow. It is clear, that such a type of harrow, employs a series or gang of the spring teeth 10 which are fastened in any suitable manner to a tubular bar or other support 11 on the harrow.

In lieu of the rear or distal ends of the teeth 10 engaging the soil to harrow the same, which is difficult and practically impossible when the soil is rough and hard, my improvements are attached or substituted.

In accordance with the invention, a steel disk 12 is employed of flat or concave form as preferred, and sharpened to the desired degree at the peripheral edge. A hub is provided at the center of the disk 12 comprising two sections 13 and 14 which engage opposite sides of the disk 12 and one of which has an extension 15, screw threaded at 16, in a recess of the other. These sections 13 and 14 rigidly clamp onto the disk and they collectively have a central bore 17 therethrough whereby they are journaled on a spindle 18 of a mounting or bracket generally designated 19, and which disk and hub are held on the spindle 18 by means of a nut 20 screw threaded thereto and bearing against the section 14. The other section 13 bears against a shoulder 21 of the mounting or bracket 19.

Mounting or bracket 19 has a passage or slot 22 therethrough and the latter, as well as the mounting generally is arcuate in conformity with the curvature of the tooth 10 so that the mounting may be applied to the tooth 10 by sliding movement, and positioned at any elevation or location desired, being fastened to the tooth 10 by means of screws 23 threaded in the bracket and binding at their inner ends against the tooth 10.

It will be realized that in practice, each tooth 10 of the gang of teeth on the harrow will have one of my attachments applied thereto so that each tooth will be equipped with a rotatable disk such as 12, in effect converting the spring toothed harrow into a rotary disk harrow. The attachments may be removed or applied at will through the adjustment of the screws 23.

Various changes may be resorted to provided they fall within the spirit and scope of the invention.

I claim as my invention:

1. In combination with the teeth of a spring-toothed harrow, a disk for each tooth, and means mounting the disks for longitudinal adjustment along and clamping on the individual teeth for treating engagement with the soil in lieu of the teeth.

2. In combination with a tooth of a spring-toothed harrow, a rotatable soil treating disk, means mounting said disk on the tooth to harrow the soil in lieu of the tooth, said means comprising a mounting, said mounting having a surface engaging and conforming to the adjacent surface of the tooth and longitudinal adjustment along the latter, and binding means to engage the latter surface.

3. A device of the class described comprising a bracket, means to removably attach the bracket to and longitudinally adjustable along a tooth of a spring toothed harrow, said bracket having a spindle, a soil treating disk, and means mounting said disk on said spindle.

4. A device of the class described comprising a bracket, means to removably attach the bracket to and longitudinally adjustable along a tooth of a spring toothed harrow, said bracket having a spindle, a soil treating disk, means mounting said disk on said spindle, comprising a hub, said hub being in separable parts clamping the disk between them.

5. A device of the class described comprising a bracket having an arcuate slot longitudinally adjustable along and removably engageable with a tooth of a spring toothed harrow, means on the bracket to bind against such tooth, a spindle extending laterally from the bracket, a soil treating disk, a hub comprising separable parts in screw threaded relation clamping the disk between them, said parts collectively having a bore journaled on the spindle, and means to prevent displacement of the disk and hub from the spindle.

LLOYD W. RUSHBROOK.